US012750583B2

(12) United States Patent
Yanai

(10) Patent No.: US 12,750,583 B2
(45) Date of Patent: Sep. 29, 2026

(54) ELECTRONIC APPARATUS, CONTROL METHOD OF ELECTRONIC APPARATUS, AND STORAGE MEDIUM

(71) Applicant: CANON KABUSHIKI KAISHA, Tokyo (JP)

(72) Inventor: Shotaro Yanai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 18/582,302

(22) Filed: Feb. 20, 2024

(65) Prior Publication Data

US 2024/0298087 A1 Sep. 5, 2024

(30) Foreign Application Priority Data

Mar. 2, 2023 (JP) ................................ 2023-031864

(51) Int. Cl.

*H04N 23/65* (2023.01)
*H04N 23/611* (2023.01)
*H04N 23/80* (2023.01)

(52) U.S. Cl.

CPC ......... *H04N 23/651* (2023.01); *H04N 23/611* (2023.01); *H04N 23/80* (2023.01)

(58) Field of Classification Search

CPC .... H04N 23/651; H04N 23/611; H04N 23/80; H04N 23/60; H04N 23/667

See application file for complete search history.

(56) References Cited

U.S. PATENT DOCUMENTS

| | | | | |
|---|---|---|---|---|
| 9,652,091 B1 * | 5/2017 | Obeidat | ................ | G06F 3/0416 |
| 2010/0173679 A1 * | 7/2010 | Moon | ................ | H04W 52/027 455/566 |
| 2014/0043498 A1 * | 2/2014 | Lee | ................ | H04N 23/61 348/222.1 |
| 2016/0195916 A1 * | 7/2016 | Shiozaki | ................ | G06F 1/1637 345/173 |
| 2017/0351373 A1 * | 12/2017 | Ueno | ................ | G06F 3/04845 |
| 2020/0372189 A1 * | 11/2020 | Zhang | ................ | G06V 40/16 |
| 2022/0124243 A1 * | 4/2022 | Takei | ................ | H04N 23/632 |
| 2022/0400201 A1 * | 12/2022 | Funatsu | ................ | H04N 23/611 |
| 2024/0168582 A1 * | 5/2024 | Zhang | ................ | G06F 1/1684 |

FOREIGN PATENT DOCUMENTS

JP 2004312477 A 11/2004

* cited by examiner

*Primary Examiner* — Timothy J Henn

(74) *Attorney, Agent, or Firm* — Cowan, Liebowitz & Latman, P.C.

(57) ABSTRACT

An electronic apparatus includes a display unit configured to detect contact with an object using a detector, and a processor configured to change between a first power mode and a second power mode that consumes less power than the first power mode, based on a contact area size of an object on the display unit detected by the detector.

10 Claims, 6 Drawing Sheets

ELECTRONIC APPARATUS, CONTROL METHOD OF ELECTRONIC APPARATUS, AND STORAGE MEDIUM

BACKGROUND

Technical Field

One of the aspects of the embodiments relates to an electronic apparatus, its control method, and a storage medium.

Description of Related Art

Japanese Patent Laid-Open No. 2004-312477 discloses a power control apparatus that detects, based on a change in the attitude of an electronic apparatus, that the electronic apparatus is removed from an accommodation location such as a bag or clothing pocket, and automatically turns on the power. Thereby, imaging can be immediately performed at an intended timing without any operation for turning on the power. The electronic apparatus disclosed in Japanese Patent Laid-open No. 2004-312477 discloses a method for preventing power consumption by automatically turning off the power if an image does not change and no operation is performed within a predetermined time after the power is turned on.

However, the electronic apparatus disclosed in Japanese Patent Laid-Open No. 2004-312477 cannot recognize the user's state during imaging. Thus, the power consumption of the electronic apparatus may not be able to be reduced by keeping the power on even though the power is actually unnecessary.

SUMMARY

An electronic apparatus according to one aspect of the disclosure includes a display unit configured to detect contact with an object using a detector, and a processor configured to change between a first power mode and a second power mode that consumes less power than the first power mode, based on a contact area size of an object on the display unit detected by the detector. A control method of the above electronic apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
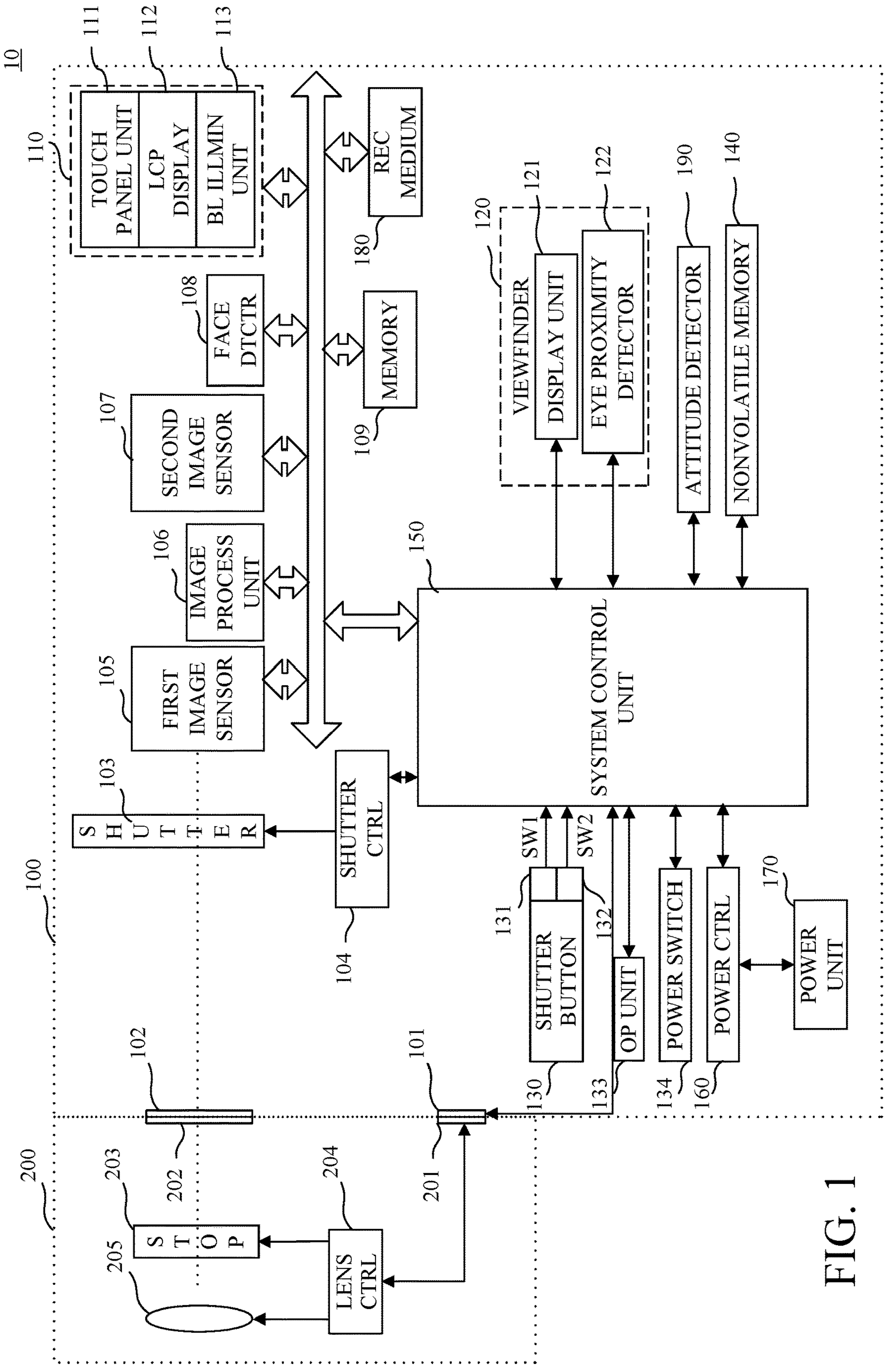
FIG. 1 is a block diagram of an electronic apparatus according to this embodiment.

Referring now to FIG. 1, a description will be given of an imaging system 10 according to this embodiment. FIG. 1 is a block diagram of the imaging system 10. The imaging system 10 includes an image pickup apparatus (camera body) 100 and a lens apparatus (interchangeable lens) 200 attachable to and detachable from the image pickup apparatus 100. However, this embodiment is not limited to this example, and the image pickup apparatus 100 and the lens apparatus 200 may be integrated. This embodiment will specifically describe the image pickup apparatus 100, but may be applied to electronic apparatuses other than the image pickup apparatus 100.

A shutter control unit 104 controls a shutter 103 based on exposure information from an image processing unit 106 in cooperation with a lens control unit 204 that controls an aperture stop 203. A first image sensor 105 converts an optical image of an unillustrated object formed through a lens (optical system) 205, the aperture stop 203, lens mounts 202 and 102, and the shutter 103 into an electrical signal. The image processing unit 106 performs predetermined calculation processing for the image signal output from the first image sensor 105, and performs image processing such as pixel interpolation processing, color conversion processing, or white balance processing based on the result of the calculation processing. The processed image data is output to a liquid crystal panel display unit 112 of a display apparatus (display unit, rear monitor) 110 or a display unit 121 of the viewfinder 120. The image processing unit 106 also has an image compression function such as Joint Photographic Experts Group (JPEG).

A second image sensor (in-camera) 107 is provided on the back side of the image pickup apparatus 100, and acquires an image in the back direction of the image pickup apparatus 100, such as an image of the user. A face detector 108 detects whether or not the user's face is included in the image acquired by the second image sensor 107. A memory 109 is, for example, a RAM, and stores captured still images, moving images, image data for playback display, and the like. The memory 109 has a storage capacity sufficient to store a predetermined number of still images or moving images. The memory 109 has a program stack area, a status storage area, a calculation area, a work area, and an image display data area for a system control unit 150. Various calculations are executed by the system control unit 150 using the calculation area of the memory 109.

The display apparatus 110 is a liquid crystal display type display apparatus with a touch panel function, and includes a touch panel unit 111, a liquid crystal panel display unit 112, and a backlight illumination unit 113. The liquid crystal panel display unit 112 can display a menu screen stored in the image display data area of the memory 109 or an image file stored in a recording medium 180 according to instructions from the system control unit 150. The liquid crystal panel display unit 112 can perform live-view imaging by sequentially displaying the imaging data obtained from the first image sensor 105 as a through image on a real-time basis. The backlight illumination unit 113 performs rear illumination (backlight illumination) for the liquid crystal panel display unit 112. The light source element for backlight illumination may be an Light Emitting Diode (LED), an organic electro-luminescence (EL), a fluorescent tube, or the like, but is not limited to this example. The backlight illumination unit 113 can arbitrarily turn on or off the illumination according to instructions from the system control unit 150. The touch panel unit 111 as a detector that can detect the contact of an object uses a capacitance method as a touch detecting method. The touch panel unit 111 enables intuitive device operations such as touch autofocus (AF) to focus on a position touched by the user.

Figure 2:
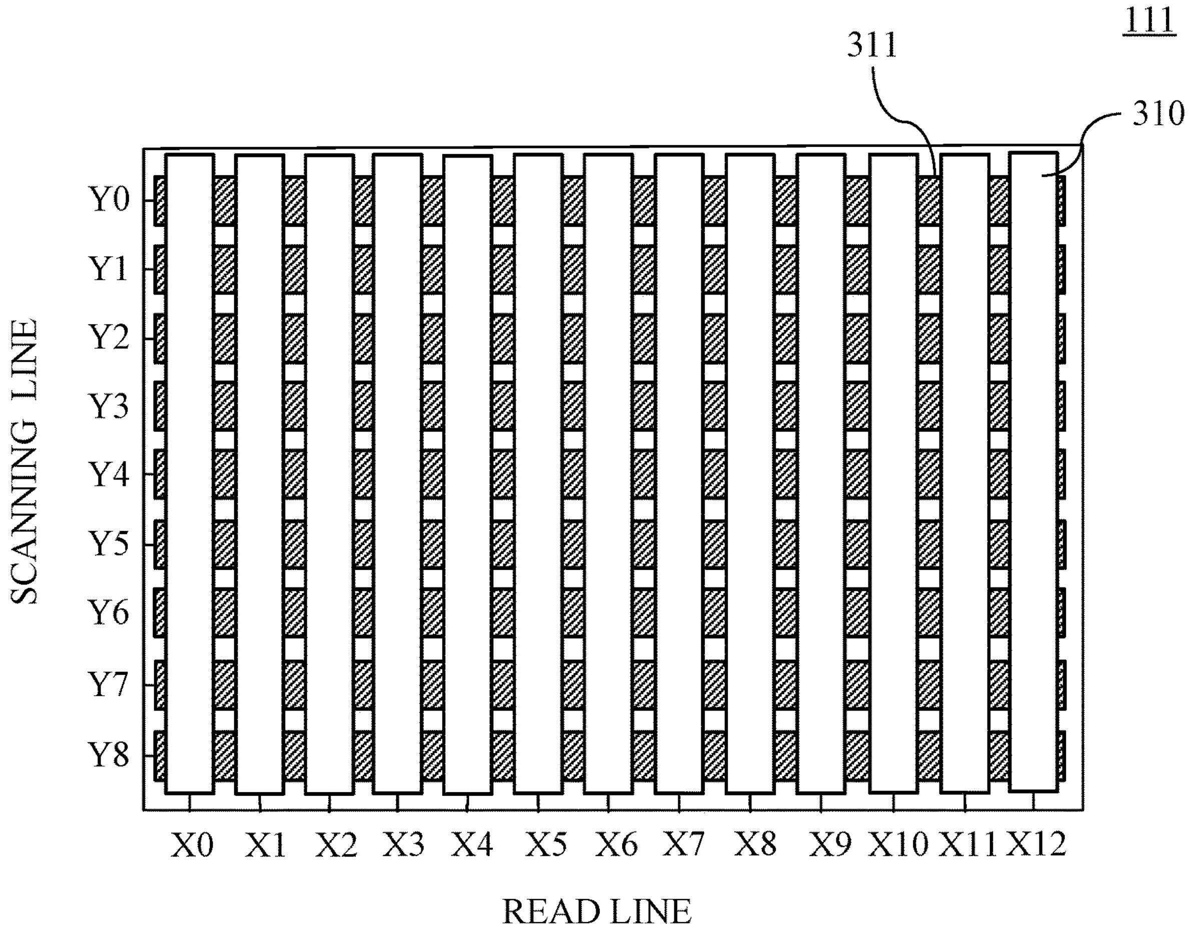
FIG. 2 is a configuration diagram of a touch panel unit according to this embodiment.

Referring now to FIG. 2, a description will be given of the configuration of the touch panel unit 111. FIG. 2 is a configuration diagram of the touch panel unit 111. As illustrated in FIG. 2, the touch panel unit 111 includes electrodes that have a plurality of column electrodes 310 arranged in columns (arranged along the horizontal direction) and a plurality of row electrodes 311 arranged in rows (arranged along the vertical direction) that are arranged orthogonal to each other. The row electrodes 311 among the orthogonal electrodes are used as scanning lines, and the column electrodes 310 are used as read lines. The touch panel unit 111 determines the presence or absence of a touch by detecting a capacitance change at the intersection of the electrodes in a case where these scanning lines and read lines are driven. In a case where the touch panel unit 111 detects that a predetermined number of touch-detected intersections have occurred within a predetermined area on the preset touch panel surface, the touch panel unit 111 can detect contact (surface contact) with a surface having an area larger than a predetermined area. An area for detecting the surface contact or conditions such as the number of intersections for determining the surface contact can be arbitrarily changed according to a command from the system control unit 150.

The viewfinder 120 includes an unillustrated optical system (finder optical system), a display unit (intra-finder display unit) 121 different from the liquid crystal panel display unit 112, and an eye proximity detector 122. The display unit 121 is a liquid crystal panel, an organic EL, or the like disposed inside the viewfinder 120. Similarly to the liquid crystal panel display unit 112, the display unit 121 displays a menu screen stored in the image display data area of the memory 109 or the image file stored on the recording medium 180 according to instructions from the system control unit 150.

The eye proximity detector 122 is, for example, a proximity sensor having an infrared LED light emitter, a photodiode light receiver, and the like. The eye proximity detector 122 is disposed outside the optical system of the viewfinder 120 and detects that the user is using the viewfinder 120. In a case where the eye proximity detector 122 detects that the user's face is close to the viewfinder 120, the system control unit 150 changes the display destination from the display apparatus 110 as a rear monitor to the display unit 121 in the viewfinder 120. Conversely, in a case where the eye proximity detector 122 does not detect that the user's face is close to the viewfinder 120, it changes the display destination from the display unit 121 in the viewfinder 120 to the display apparatus 110.

A shutter button 130 is an operation unit for imaging instruction, and includes a first shutter switch 131 and a second shutter switch 132. The first shutter switch 131 is turned on in a case where the shutter button 130 is half-pressed (imaging preparation instruction) during operation of the shutter button 130, and generates a first shutter switch signal SW1. The first shutter switch signal SW1 starts operations such as AF processing, auto-exposure (AE) processing, auto white balance (AWB) processing, flash pre-emission (FE) processing, and imaging with the first image sensor 105. The second shutter switch 132 is turned on in a case where the operation of the shutter button 130 is completed, that is, in a case where the shutter button 130 is fully pressed (imaging instruction), and generates a second shutter switch signal SW2. The system control unit 150 performs a series of imaging processing operations from signal readout from the first image sensor 105 to writing image data to the recording medium 180 using the second shutter switch signal SW2.

The operation unit 133 is an operation unit for inputting various predetermined operation instructions to the system control unit 150, and uses any one of a switch, a dial, a touch panel, a pointing device based on line-of-sight detection, a voice recognition apparatus, etc., or a combination thereof. A power switch 134 can switch and set each mode of powering on or powering off the image pickup apparatus 100. A nonvolatile memory 140 can be electrically erased and recorded, and is a flash memory, an electrically erasable programmable read-only memory (EEPROM), or the like. The nonvolatile memory 140 stores an imaging state, a program for controlling the image pickup apparatus 100, and the like.

The system control unit 150 is a control unit that has at least one processor and controls the operation of the entire image pickup apparatus 100. A power supply control unit 160 includes a battery detecting circuit, a protection circuit, a DC-DC converter, an LDO regulator, and the like. The power supply control unit 160 has a function of protecting a load circuit connected to the power supply circuit by cutting off the power supply in detecting the presence or absence of a battery, a type of battery, the remaining capacity, or an overcurrent. The power supply control unit 160 controls a power supply unit 170 based on instructions from the system control unit 150, and supplies a desired power supply voltage to each component in the image pickup apparatus 100 for a desired period. The power supply unit 170 is a primary battery such as an alkaline battery or a lithium battery, a secondary battery such as a NiCd battery, a NiMH battery, or a Li battery, or an AC adapter. The recording medium 180 is a semiconductor memory or the like removably attached to the image pickup apparatus 100 and configured to record or read image data. An attitude detector 190 is an acceleration sensor or the like, and detects at least a roll angle and a pitch angle. Thereby, the horizontal and vertical positions and the tilt in the tilt direction of the image pickup apparatus 100 can be detected.

The lens apparatus 200 can guide an optical image of an unillustrated object through the lens 205, aperture stop 203, lens mounts 202 and 102, and shutter 103, and form it on the first image sensor 105. The lens control unit 204 controls the entire lens apparatus 200. The lens control unit 204 transmits information to the image pickup apparatus 100 via the connectors 101 and 201 that electrically connect the image pickup apparatus 100 and the lens apparatus 200, or performs various lens controls, such as focusing and zooming, according to instructions from the system control unit 150.

Figure 3:
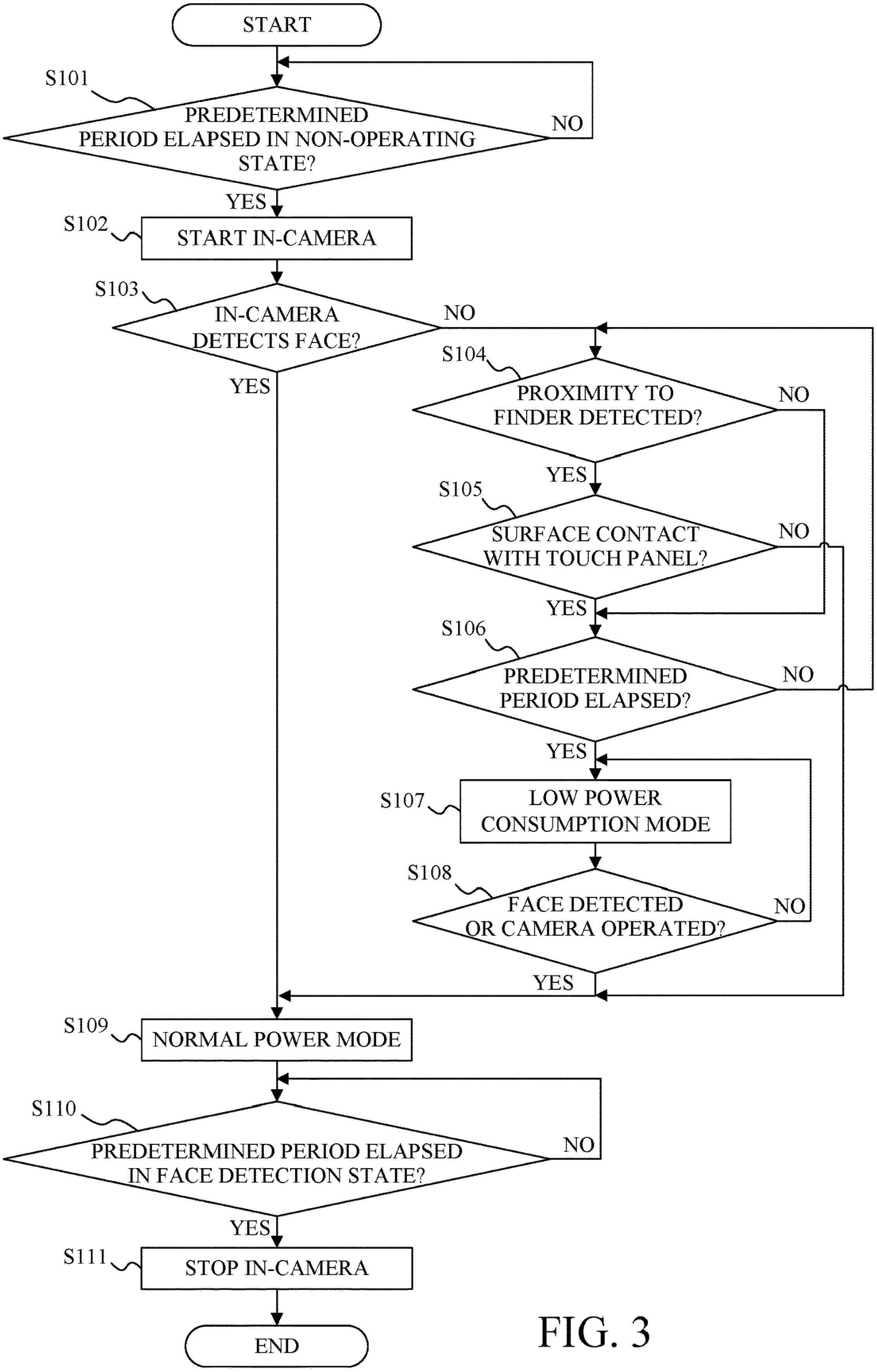
FIG. 3 is a flowchart illustrating processing of the electronic apparatus according to this embodiment.

Referring now to FIG. 3, a description will be given of processing of the image pickup apparatus (electronic apparatus) 100, that is, power saving control using the surface contact detection function of the touch panel unit 111. FIG. 3 is a flowchart illustrating the processing of the image pickup apparatus 100. Each step in FIG. 3 is realized by the system control unit 150 of the image pickup apparatus 100 loading a program stored in the nonvolatile memory 140 into the memory 109, executing it, and thereby controlling each functional block.

First, in step S101, the system control unit 150 determines whether a predetermined period while the user does not operate the image pickup apparatus 100 (in the non-operating state) has elapsed. Here, the predetermined period is a period, such as 10 seconds or 20 seconds, that is evaluated to indicate that the user unlikely intends to capture an image, and can be properly set. In a case where it is determined that the predetermined period has not elapsed in the non-operating state, step S101 is repeated until it is determined that the predetermined period has elapsed. On the other hand, in a case where it is determined that the predetermined period has elapsed, the flow proceeds to step S102.

In step S102, the system control unit 150 starts the second image sensor (in-camera) 107. Next, in step S103, the system control unit 150 determines whether the user's face has been detected using the second image sensor 107. For example, the face detector 108 can detect whether the user's face is included in the image by analyzing the image in the user direction acquired by the second image sensor 107. In a case where it is determined that the user's face has been detected, the flow proceeds to step S109. On the other hand, in a case where it is determined that no face is detected, the flow proceeds to step S104.

Figure 4A:
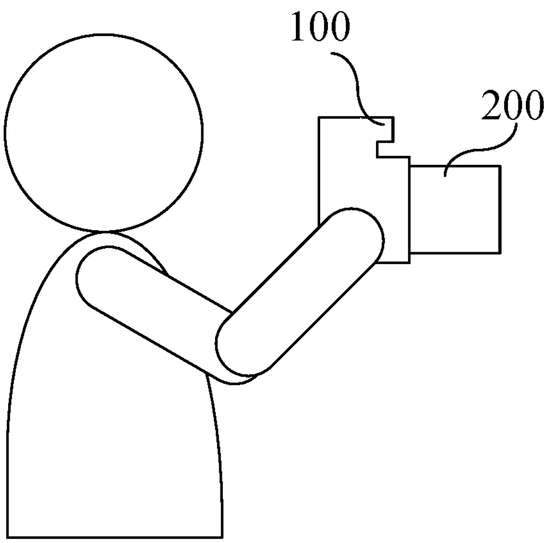
FIGS. 4A, 4B, 4C, and 4D illustrate use states of the electronic apparatus in this embodiment.
Figure 4B:
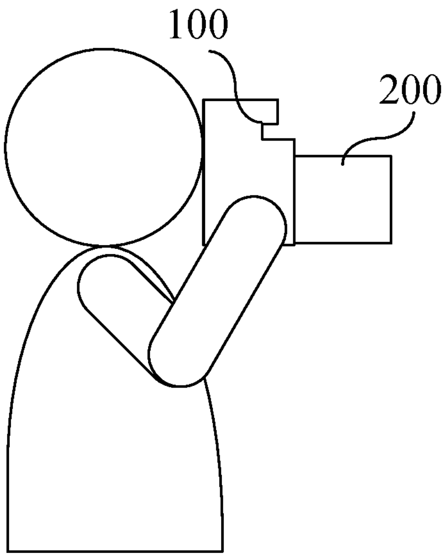
Figure 4C:
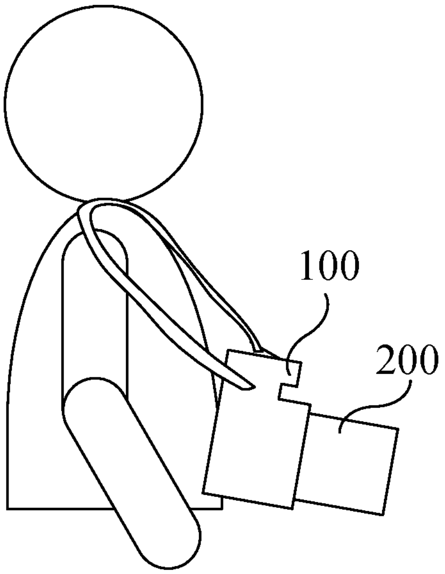

Referring now to FIGS. 4A, 4B, 4C, and 4D, a description will be given of the (use) states of the image pickup apparatus 100 in a case where the user's face is and is not detected from the image acquired by the second image sensor 107. FIGS. 4A, 4B, 4C, and 4D illustrate the use states of the image pickup apparatus 100. FIG. 4A illustrates a case where it is determined that the face has been detected, which is a live-view imaging state in which the user captures an image while viewing the display apparatus 110 as the rear monitor. In a case where the face is detected in this way, it is determined that the user intends to capture an image. FIGS. 4B and 4C illustrate the case where it is determined that no face is detected. FIG. 4B illustrates a state in which the user is capturing an image with a viewfinder, and FIG. 4C illustrates a state in which the image pickup apparatus 100 is hung from the user's neck with a strap. In such a case, the user may or may not intend to capture an image.

In step S104, the system control unit 150 determines whether the proximity of an object to the viewfinder 120 is detected using the eye proximity detector 122. In a case where the proximity of the object to the viewfinder 120 is detected, the flow proceeds to step S105. On the other hand, in a case where the proximity of the object to the viewfinder 120 is not detected, the flow proceeds to step S106.

In step S105, the system control unit 150 determines whether surface contact with the touch panel unit 111 has occurred. In a case where it is determined that surface contact has occurred with the touch panel unit 111, the flow proceeds to step S106. On the other hand, in a case where it is determined that surface contact has not occurred, the flow proceeds to step S109. Here, the system control unit 150 determines whether the state illustrated in FIG. 4B or 4C exists based on the presence or absence of the surface contact with the touch panel unit 111.

In a case where the user is in an imaging state using the viewfinder 120 as illustrated in FIG. 4B, the touch panel unit 111 does not contact anything, or the user's nose contacts the touch panel unit 111. At this time, since the contact area is the size of the tip of the nose, the surface contact is not detected. On the other hand, in the neck-hanging state illustrated in FIG. 4C, the user's torso contacts the touch panel unit 111. Since the contact area at this time is assumed to be wider than that of a finger or nose, the determination can be made based on the surface contact. In this embodiment, the threshold area for the surface contact is set, for example, to two ways. A first threshold value is used to discriminate between a nose touch and a finger touch in a case where the viewfinder 120 is used, and a second threshold value is used to discriminate between a nose touch and a torso touch in a case where the viewfinder 120 is used. The magnitude relationship of each threshold is set as follows, for example:

Finger Size<First Threshold<Nose Size<Second Threshold

The determination threshold in step S105 is the second threshold. Providing two thresholds having such a relationship can detect contact with the torso without misrecognizing contact with the nose in using the viewfinder 120 as a finger touch operation.

Figure 5A:
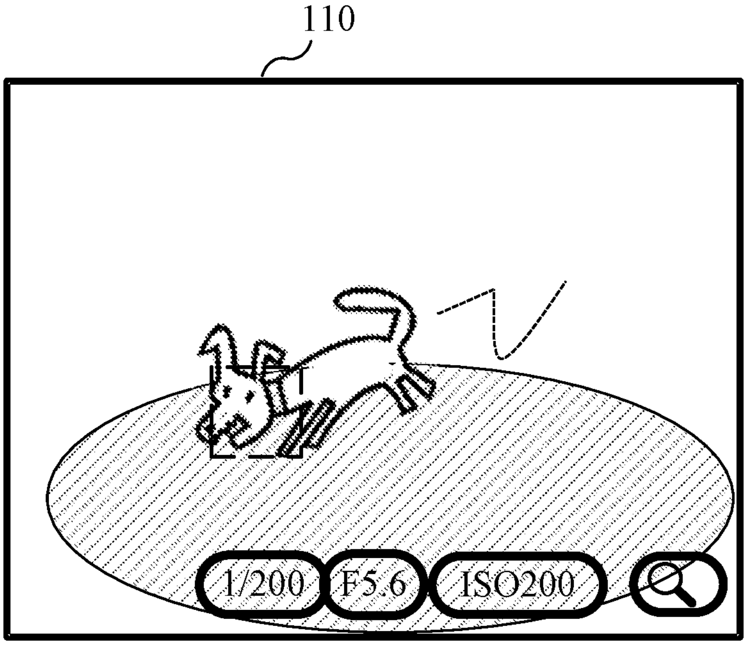
FIGS. 5A, 5B, and 5C illustrate a surface detecting area of the touch panel unit in this embodiment.
Figure 5B:
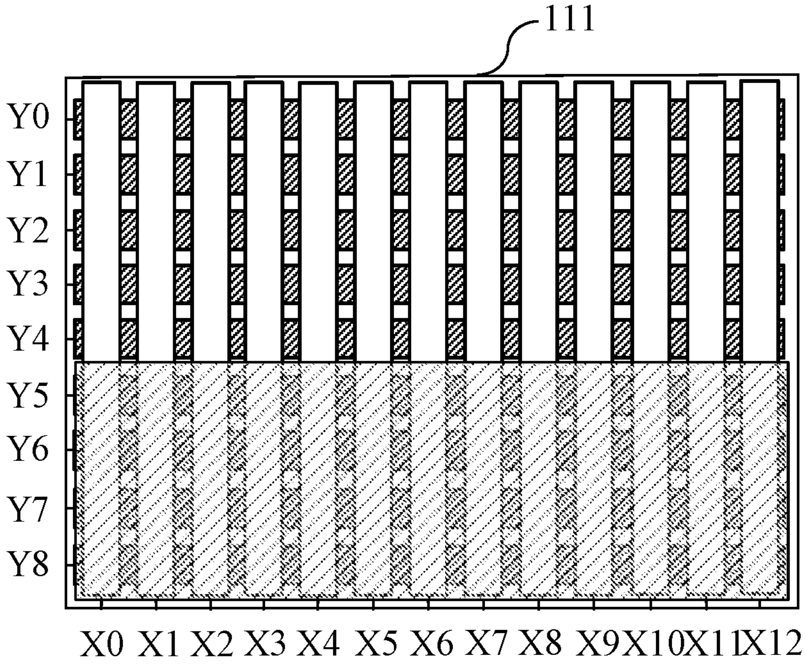
Figure 5C:
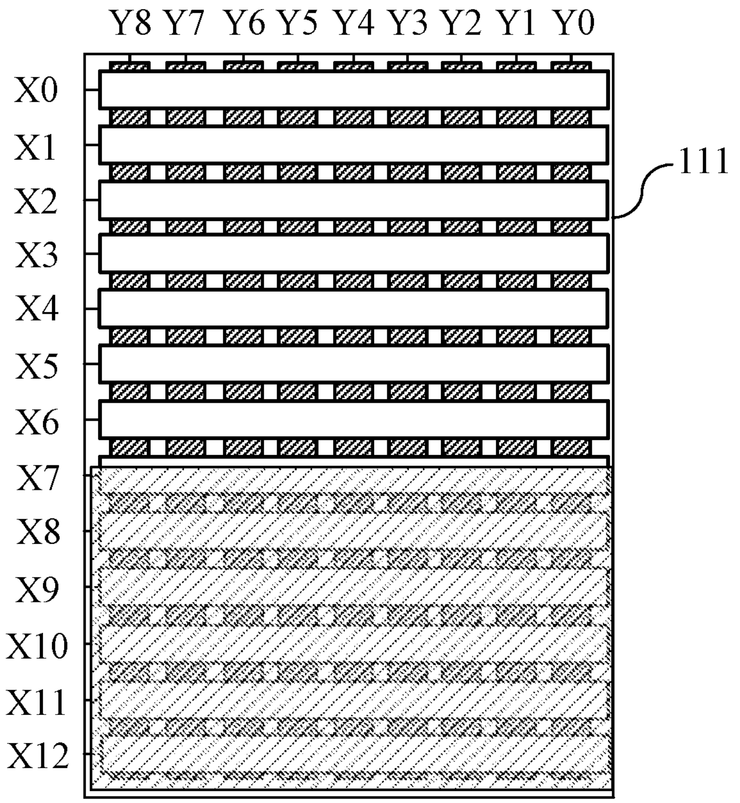

The torso contact in the neck hanging state may be determined on the condition of a detection area on the touch panel unit 111. FIGS. 5A, 5B, and 5C illustrate surface detection areas on the touch panel unit 111. FIG. 5A illustrates an example live-view image, and FIG. 5B illustrates the structure of the touch panel unit 111. The torso likely contacts a lower area of the display apparatus 110 as the rear monitor when viewed from the user, as illustrated by a shaded area in FIG. 5A. Therefore, as illustrated in the shaded area in FIG. 5B, by regarding a contact with an area exceeding the second threshold in the lower area (partial area) of the touch panel unit 111 as the torso contact, the torso contact can be more accurately determined. In a case where the attitude detector 190 determines that the image pickup apparatus 100 is in the vertical position, the shaded area in FIG. 5C becomes the surface contact detection area. As described above, the surface contact detection area of the touch panel unit 111 may be set by the system control unit 150 to a lower area (partial area) when viewed from the user.

In step S106 in FIG. 3, the system control unit 150 determines whether a predetermined period has elapsed in a state where the surface contact with the touch panel unit 111 has occurred. In a case where it is determined that the predetermined period has elapsed, the flow proceeds to step S107. On the other hand, in a case where it is determined that the predetermined period has not elapsed (in a case where the surface contact is not detected before the predetermined period elapses), the flow returns to step S104. Here, the case where the predetermined period has elapsed can be considered to be a state where the touch panel unit 111 continuously contacts an area larger than a finger or nose, that is, a state as illustrated in FIG. 4C. In this case, it is determined that the user does not intend to capture an image.

In step S107, since it is determined that the user has no intention of imaging, the system control unit 150 sets the image pickup apparatus 100 to a low power consumption mode (a second power mode with lower power consumption than the first power mode). As specific control for reducing power consumption in the low power consumption mode, the system control unit 150 stops the imaging operation of the first image sensor 105, turns off the display apparatus 110, etc. Next, in step S108, the system control unit 150 determines whether the face detector 108 has detected the user's face from the image acquired by the second image sensor 107, or the user has operated the shutter button 130 or the operation unit 133 (camera operation). In a case where it is determined that the user's face has been detected or that the camera has been operated, the flow proceeds to step S109. On the other hand, in a case where the state in which the user's face is not detected or no camera operation continues, the process returns to step S107.

In step S109, the system control unit 150 sets a normal power mode (first power mode) for operating all functions of the image pickup apparatus 100. In a case where the user's face is detected in step S103, or in a case where the user's face is detected or the user operation is performed in the low power consumption mode in step S108, it can be determined that the user has the intention of imaging. Therefore, the image pickup apparatus 100 is operated in the normal power mode in which all functions can be operated.

Next, in step S110, the system control unit 150 determines whether the predetermined period has elapsed in a state in which the user's face has been detected by the face detector 108 during operation in the normal power mode. In a case where it is determined that the predetermined period has not elapsed, step S110 is repeated. On the other hand, in a case where it is determined that the predetermined period has elapsed, the flow proceeds to step S111. In step S111, the system control unit 150 stops imaging of the second image sensor 107 because it is determined that the imaging operation is being continuously performed and determining the imaging intention based on face detection is unnecessary.

In this embodiment, the system control unit 150 changes a first power mode and a second power mode that consumes less power than the first power mode, based on the contact area size of the object on the display apparatus 110 detected by the touch panel unit 111. Thus, the user's intention of imaging can be more accurately determined by using the surface contact detection result of the touch panel unit 111, and thereby power saving control can be more accurately performed. In this embodiment, the touch panel unit 111 uses a capacitive touch panel, but may use another method such as a resistive film method as long as the surface contact can be detected.

Figure 4D:
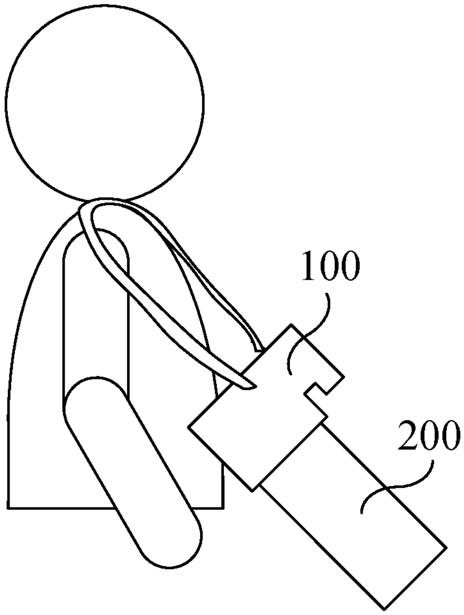

In this embodiment, in a case where a large and heavy lens apparatus 200 such as a telephoto lens is attached, the image pickup apparatus 100 tilts significantly as illustrated in FIG. 4D, the torso does not contact the touch panel unit 111 or only an area smaller than the second threshold of the surface contact can be in contact. Furthermore, at this time, since the rear surface of the image pickup apparatus 100 faces toward the user's face, the face may be included in the field of view of the second image sensor 107 and the face may be detected. As a result, the condition for face detection or surface contact detection matches the state illustrated in FIG. 4A.

To avoid this problem, the system control unit 150 may use the result of the attitude detector 190. In a case where a face is detected in step S103 in FIG. 3, the system control unit 150 determines the type of the attached lens apparatus 200 through communication with the lens apparatus 200. Based on the result, it may be determined that the lens apparatus 200 is a heavy lens apparatus such as a telephoto lens, and the attitude detector 190 may detect that the tilt of the image pickup apparatus 100 in the tilting direction is equal to or greater than a predetermined value. In this case, the system control unit 150 determines that the state illustrated in FIG. 4D exists, and changes from the normal power mode to the low power consumption mode. Information on the size and weight for each type of lens apparatus 200 to be referred to at this time is stored in the nonvolatile memory 140.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide an electronic apparatus that can more effectively reduce power consumption.

This application claims the benefit of Japanese Patent Application No. 2023-031864, which was filed on Mar. 2, 2023, and which is hereby incorporated by reference herein in its entirety.

What is claimed is:

1. An electronic apparatus comprising:

a display unit configured to detect contact with an object using a detector; and a processor configured to change between a first power mode and a second power mode that consumes less power than the first power mode, based on a contact area size of an object on the display unit detected by the detector, wherein a threshold for the contact area size includes a first threshold and a second threshold larger than the first threshold.

2. The electronic apparatus according to claim 1, further comprising an attitude detector configured to detect an attitude of the electronic apparatus, wherein the processor causes the electronic apparatus to operate in the second power mode when determining that the contact area size in a partial area of the display unit determined based on the attitude is larger than the second threshold.

3. The electronic apparatus according to claim 2, wherein the partial area is an area on a lower side of the display unit when viewed from a face of a user.

4. A control method of an electronic apparatus, the control method comprising the steps of:

determining a contact area size of an object that contacts a display unit configured to detect contact with the object using a detector, the contact area size on the display unit being detected by the detector; and changing between a first power mode and a second power mode that consumes less power than the first power mode, based on the contact area size, wherein a threshold for the contact area size includes a first threshold and a second threshold larger than the first threshold.

5. A non-transitory computer-readable storage medium storing a program for causing a computer to execute the control method according to claim 4.

6. An electronic apparatus comprising:

a display unit configured to detect contact with an object using a detector;

an image sensor configured to acquire an image data obtained by imaging a user; and a face detector configured to detect a face of the user the from the image data, and a processor configured to change between a first power mode and a second power mode that consumes less power than the first power mode, based on a contact area size of an object on the display unit detected by the detector, wherein the processor causes the electronic apparatus to operate in the first power mode when determining that the face of the user has been detected by the face detector, and the processor causes the electronic apparatus to operate in the second power mode in a case where the face of the user is not detected and a surface contact on the display unit is detected.

7. The electronic apparatus according to claim 6, further comprising an attitude detector configured to detect a tilt in a tilt direction of the electronic apparatus, wherein the processor determines whether the first power mode is to be changed to the second power mode based on the tilt detected by the attitude detector and a type of a lens apparatus attached to the electronic apparatus when determining that the face of the user has been detected by the face detector and the surface contact has not been detected.

8. A control method of an electronic apparatus, the control method comprising the steps of:

determining a contact area size of an object that contacts a display unit configured to detect contact with the object using a detector, the contact area size on the display unit being detected by the detector;

changing between a first power mode and a second power mode that consumes less power than the first power mode, based on the contact area size;

operating in the first power mode when determining that the face of the user has been detected by a face detector; and operating in the second power mode in a case where the face of the user is not detected and a surface contact on the display unit is detected.

9. An electronic apparatus comprising:

a display unit configured to detect contact with an object using a detector; and a processor configured to change between a first power mode and a second power mode that consumes less power than the first power mode, based on a contact area size of an object on the display unit detected by the detector, wherein the processor causes the electronic apparatus to operate in the second power mode when determining that proximity of an object to a viewfinder different from the display unit is detected and a surface contact on the display unit is detected.

10. A control method of an electronic apparatus, the control method comprising the steps of:

determining a contact area size of an object that contacts a display unit configured to detect contact with the object using a detector, the contact area size on the display unit being detected by the detector;

changing between a first power mode and a second power mode that consumes less power than the first power mode, based on the contact area size; and operating in the second power mode when determining that proximity of an object to a viewfinder different from the display unit is detected and a surface contact on the display unit is detected.

* * * * *